United States Patent
Kawada et al.

(10) Patent No.: US 10,434,574 B2
(45) Date of Patent: Oct. 8, 2019

(54) LAMINATING AND SHAPING APPARATUS

(71) Applicant: Sodick Co., Ltd., Kanagawa (JP)

(72) Inventors: Shuichi Kawada, Kanagawa (JP);
Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 214 days.

(21) Appl. No.: 15/668,704

(22) Filed: Aug. 4, 2017

(65) Prior Publication Data
US 2018/0133796 A1    May 17, 2018

(30) Foreign Application Priority Data

Nov. 16, 2016 (JP) ................................. 2016-222919

(51) Int. Cl.
| | | |
|---|---|---|
| *B29C 67/00* | (2017.01) | |
| *B22F 3/105* | (2006.01) | |
| *B33Y 30/00* | (2015.01) | |
| *B33Y 70/00* | (2015.01) | |
| *B33Y 40/00* | (2015.01) | |

(52) U.S. Cl.
CPC ............ *B22F 3/1055* (2013.01); *B33Y 30/00* (2014.12); *B33Y 40/00* (2014.12); *B33Y 70/00* (2014.12); *B22F 2003/1056* (2013.01); *B22F 2201/10* (2013.01); *B22F 2999/00* (2013.01); *Y02P 10/295* (2015.11)

(58) Field of Classification Search
CPC ......... B29C 64/20; B33Y 30/00; B33Y 40/00; B33Y 50/02; B22F 3/1055
See application file for complete search history.

(56) References Cited

U.S. PATENT DOCUMENTS

| | | |
|---|---|---|
| 5,132,143 A | 7/1992 | Deckard |
| 5,316,580 A | 5/1994 | Deckard |
| 5,597,589 A | 1/1997 | Deckard |
| 5,616,294 A | 4/1997 | Deckard |
| 5,639,070 A | 6/1997 | Deckard |
| 8,209,044 B2 | 6/2012 | Inoue |
| 8,276,489 B2 | 10/2012 | Araie et al. |

(Continued)

FOREIGN PATENT DOCUMENTS

| | | |
|---|---|---|
| CN | 101321598 | 12/2008 |
| CN | 101535032 | 9/2009 |

(Continued)

OTHER PUBLICATIONS

US 4,937,420 A, 06/1990, Deckard (withdrawn)

*Primary Examiner* — Joseph S Del Sole
*Assistant Examiner* — Thu Khanh T Nguyen
(74) *Attorney, Agent, or Firm* — JCIPRNET

(57) ABSTRACT

A gas collecting mechanism installed in the laminating and shaping apparatus has a partition section extending from a ceiling section of the chamber along a second wall surface with a predetermined interval therebetween, a first gas collecting port formed in the partition section, a suction apparatus installed in the first gas collecting port, a first gas guide space section formed between the partition section and the second wall surface, a first duct communicating with the first gas guide space section and installed on the ceiling section, a second gas collecting port formed on the ceiling section adjacent to the second wall surface, and a second duct communicating with the second gas collecting port.

5 Claims, 6 Drawing Sheets

(56) References Cited

U.S. PATENT DOCUMENTS

| | | | |
|---|---|---|---|
| 9,604,410 B2 | 3/2017 | Okazaki et al. | |
| 9,844,915 B2 | 12/2017 | Maeda et al. | |
| 10,029,308 B2 | 7/2018 | Kawada et al. | |
| 2015/0367573 A1* | 12/2015 | Okazaki | B29C 64/153 |
| | | | 425/174.4 |
| 2017/0014905 A1 | 1/2017 | Kawada et al. | |

FOREIGN PATENT DOCUMENTS

| | | |
|---|---|---|
| CN | 104972120 | 10/2015 |
| CN | 105312567 | 2/2016 |
| CN | 105397084 | 3/2016 |
| JP | H01502890 | 10/1989 |
| JP | 5960330 | 8/2016 |
| KR | 20090068683 | 6/2009 |

\* cited by examiner

LAMINATING AND SHAPING APPARATUS

CROSS-REFERENCE TO RELATED APPLICATION

This application claims the priority benefit of Japan application serial no. 2016-222919, filed on Nov. 16, 2016. The entirety of the above-mentioned patent application is hereby incorporated by reference herein and made a part of this specification.

BACKGROUND OF THE INVENTION

Field of the Invention

The present invention relates to a laminating and shaping apparatus for manufacturing a laminated and shaped article of a metal.

Description of Related Art

As an apparatus for manufacturing a laminated and shaped article of a metal, a laminating and shaping apparatus is disclosed in Patent Document 1. In the laminating and shaping apparatus, a sintered layer is formed by moving a recoater head in a horizontal single axis direction, supplying a powder material of a metal using a material storage box and a blade installed in a recoater head and forming a powder layer on a table through planarization, and radiating a laser to a predetermined area of the powder layer using a laser radiation apparatus. Then, a laminated and shaped article of a metal is manufactured by repeating forming of a new powder layer on the sintered layer, radiating a laser to the powder layer and forming a sintered layer.

In addition, when the powder material is sintered by the laser, an environment around a predetermined irradiation region needs to be an atmosphere in which as much as possible no oxygen is present such that a laser having a required energy can always be stably radiated while protecting the powder material from being altered. For this purpose, a method of sintering a powder material under an atmosphere, in which an oxygen concentration is sufficiently low, by accommodating a table on which a powder layer is formed and a recoater head configured to spread the powder material in a chamber that is sealed as much as possible, and supplying an inert gas into the chamber is known.

In addition, when the powder material is sintered by a laser, a specific vapor referred to as metallurgical fumes including a metal that is sublimated by heat is generated. The fumes are generated as black smoke, rise and diffuse. When the chamber is fully filled with fumes, since some of the radiated laser longitudinally crossing the inside of the chamber is interrupted, a laser having a desired energy may not be able to be radiated to the powder material, and a sintering error in a sintered layer forming process may occur. In addition, floating fine metal particles may fall and stick to the powder layer, and the quality of the sintered layer after laser sintering may be degraded.

Here, in a laminating and shaping apparatus disclosed in Patent Document 2, a supply port for an inert gas is installed on a first wall surface of a rectangular parallelepiped chamber having a recoater head, a main discharge port is installed on a second wall surface opposite to the first wall surface, and a subsidiary discharge port is installed on a ceiling section of the chamber adjacent to the second wall surface. Further, a suction apparatus is installed on a back side of the main discharge port of the second wall surface, and the suction apparatus and a fume collector are directly coupled. Accordingly, as a flow of an inert gas crossing a predetermined irradiation region including a radiation position serving as a fume source is formed along a bottom surface of the chamber, the fumes generated by laser sintering are prevented from rising and diffusing in the chamber, and the fumes are carried on the flow of the inert gas from the first wall surface toward the second wall surface. Then, as the inert gas (hereinafter, referred to as a contaminated gas) including the fumes is forcibly suctioned from a main supply port by the suction apparatus in a horizontal direction and sent to the directly coupled fume collector, the contaminated gas is discharged outside of the chamber. Further, the contaminated gas is discharged outside of the chamber to an extent that it does not exert an influence on the sintering by collecting the contaminated gas, which leaks without being collected from the main discharge port, from the subsidiary discharge port.

PRIOR ART DOCUMENT

Patent Documents

[Patent Document 1] Published Japanese Translation No. H01-502890 of PCT International Publication

[Patent Document 2] Japanese Patent No. 5960330

SUMMARY OF THE INVENTION

However, in recent times, it has become possible to sinter at a plurality of places simultaneously, or to radiate a laser having a high energy at a higher speed. In this way, when a quantity of fumes generated is larger or when a capacity of the chamber is larger than those in shaping of the related art, further improvement related to discharge of a contaminated gas is desired for withstanding a continuous operation for a long time.

In consideration of the above-mentioned circumstances, an object of the present invention is to provide a laminating and shaping apparatus capable of efficiently discharging a contaminated gas outside of a chamber.

A laminating and shaping apparatus of a first invention includes a table on which a powder material of a metal is laid; a recoater head that reciprocally moves in a horizontal single axis direction to supply the powder material onto the table and planarize the powder material to form a powder layer; a chamber configured to form a sealed space and accommodate the table and the recoater head in the sealed space; a laser radiation apparatus configured to radiate a laser to a predetermined region of the powder layer and sinter the powder layer to form a sintered layer; an inert gas supply apparatus configured to supply an inert gas into the chamber; an inert gas supply port connected to the inert gas supply apparatus and installed on a first wall surface of the chamber; a gas collecting mechanism installed from a second wall surface of the chamber opposite to the first wall surface to a ceiling section; and a gas collecting apparatus configured to collect gas collected by the gas collecting mechanism, wherein the gas collecting mechanism has: a partition section extending to a ceiling section along the second wall surface with a predetermined interval therebetween; a first gas collecting port formed in the partition section; a suction apparatus installed in the first gas collecting port; a first gas guide space section formed between the partition section and the second wall surface; a first duct communicating with the first gas guide space section and installed on the ceiling section; a second gas collecting port installed on the ceiling section adjacent to the second wall surface; and a second duct communicating with the second gas collecting port.

Here, a flow of a gas in the chamber is formed along a wall surface of the chamber. More specifically, the gas injected from the inert gas supply port installed on the first wall surface of the chamber toward the second wall surface opposite to the first wall surface forms a flow along the bottom surface of the chamber, and the gas that reaches the second wall surface is raised to the ceiling section along the second wall surface.

In the present invention, the gas collecting mechanism has the partition section extending to the ceiling section along the second wall surface at a predetermined interval, the first gas collecting port formed in the partition section, the suction apparatus installed in the first gas collecting port, the first gas guide space section formed between the partition section and the second wall surface, and the first duct communicating with the first gas guide space section and installed on the ceiling section. Accordingly, the contaminated gas from the first gas collecting port installed on the partition section can be suctioned into the first gas guide space section, can be guided along the second wall surface in the upward direction by being carried on the original flow of the contaminated gas, and can be sent to the gas collecting apparatus from the first duct installed on the ceiling section while restricting variation in direction of the flow of the contaminated gas that rises along the partition section to a minimum amount. Accordingly, according to the present invention, the contaminated gas can be more efficiently discharged outside of the chamber by utilizing the flow of the contaminated gas originally formed in the chamber.

In addition, by forming a flow of the contaminated gas for efficient collection from the first gas collecting port leading to the first gas guide space section and the first duct, an amount of contaminated gas that leaks without being collected from the first gas collecting port can be reduced. Accordingly, the contaminated gas that leaks without being collected from the first gas collecting port can be collected without leakage from the second gas collecting port, without adding to the configuration of the laminating and shaping apparatus, for example, installing a suction apparatus in the second gas collecting port. Accordingly, according to the present invention, the contaminated gas can be discharged without leakage outside of the chamber.

In the laminating and shaping apparatus of a second invention, in the first invention, the first gas collecting port, the first gas guide space section and the first duct may form a first gas collecting flow path, the second gas collecting port and the second duct may form a second gas collecting flow path, and in the first gas collecting flow path and the second gas collecting flow path, at least a section from the first gas collecting port to an upstream portion of the first duct and a section from the second gas collecting port to an upstream portion of the second duct may be separated.

Here, since the suction apparatus is installed in the first gas collecting port, regarding an amount of the contaminated gas sent to the gas collecting apparatus from the first gas collecting flow path per unit time and an amount of the contaminated gas sent to the gas collecting apparatus from the second gas collecting flow path per unit time, the amount of the contaminated gas sent to the gas collecting apparatus from the first gas collecting flow path is much larger. That is, between the first gas collecting flow path and the second gas collecting flow path, a difference in momentum of the contaminated gas flows through the insides thereof occurs. Accordingly, when the section from the first gas collecting port to the upstream portion of the first duct communicates with the section from the second gas collecting port to the upstream portion of the second duct, the contaminated gas sent from the first gas collecting flow path may stay in a portion communicating with the second gas collecting flow path or flow backward to the second gas collecting flow path to be returned to the inside of the chamber.

In the present invention, in the first gas collecting flow path and the second gas collecting flow path, at least the section from the first gas collecting port to the upstream portion of the first duct and the section from the second gas collecting port to the upstream portion of the second duct are separated. Accordingly, the contaminated gas sent from the first gas collecting flow path can be prevented from staying in the portion communicating with the second gas collecting flow path or flowing backward to the second gas collecting flow path and returning into the chamber from the second gas collecting port.

In the laminating and shaping apparatus of a third invention, in the first invention, rectifying plates configured to adjust a flow of a gas sent to the first gas guide space section in an upward direction may be installed at both sides of the suction apparatus.

In the present invention, the rectifying plates configured to adjust a flow of a gas sent to the first gas guide space section in the upward direction are installed at both sides of the suction apparatus. Accordingly, the contaminated gas can be prevented from staying in the first gas guide space section and can be more efficiently guided to the first duct.

In the laminating and shaping apparatus of a fourth invention, in the first invention, a gas guide section opening at the second wall surface side and configured to guide a gas raised to the ceiling section along the partition section without being collected from the first gas collecting port to the second gas collecting port may be installed in the second gas collecting port.

In the present invention, the gas guide section opening at the second wall surface side and configured to guide a gas raised to the ceiling section along the partition section without being collected from the first gas collecting port to the second gas collecting port is installed in the second gas collecting port. Accordingly, the contaminated gas that reaches the ceiling section can be reliably guided without being collected from the first gas collecting port to the second gas collecting port, and can be sent to the gas collecting apparatus through the second duct.

In the laminating and shaping apparatus of a fifth invention, in the first invention, the partition section may be formed to extend along an inner wall of the second wall surface from the first gas collecting port to a near side of a bottom surface of the chamber, and the gas collecting mechanism may further have a second gas guide space section formed between the partition section below the first gas supply port and the second wall surface.

In the present invention, the partition section is formed to extend along the inner wall of the second wall surface from the first gas collecting port to the near side of the bottom surface of the chamber, and the gas collecting mechanism further has the second gas guide space section formed between the partition section below the first gas collecting port and the second wall surface. Accordingly, the contaminated gas carried to a place separated from the first gas collecting port at which the suction force of the suction apparatus is reduced, i.e., adjacent to the bottom surface of the chamber can be guided along the second wall surface in the upward direction by being carried on the original flow of the contaminated gas. Accordingly, the gas carried to the place at which the suction force by the suction apparatus is reduced can be reliably guided to the first gas guide space section.

According to the present invention, the contaminated gas can be more efficiently discharged outside of the chamber.

DESCRIPTION OF THE EMBODIMENTS

Figure 1:
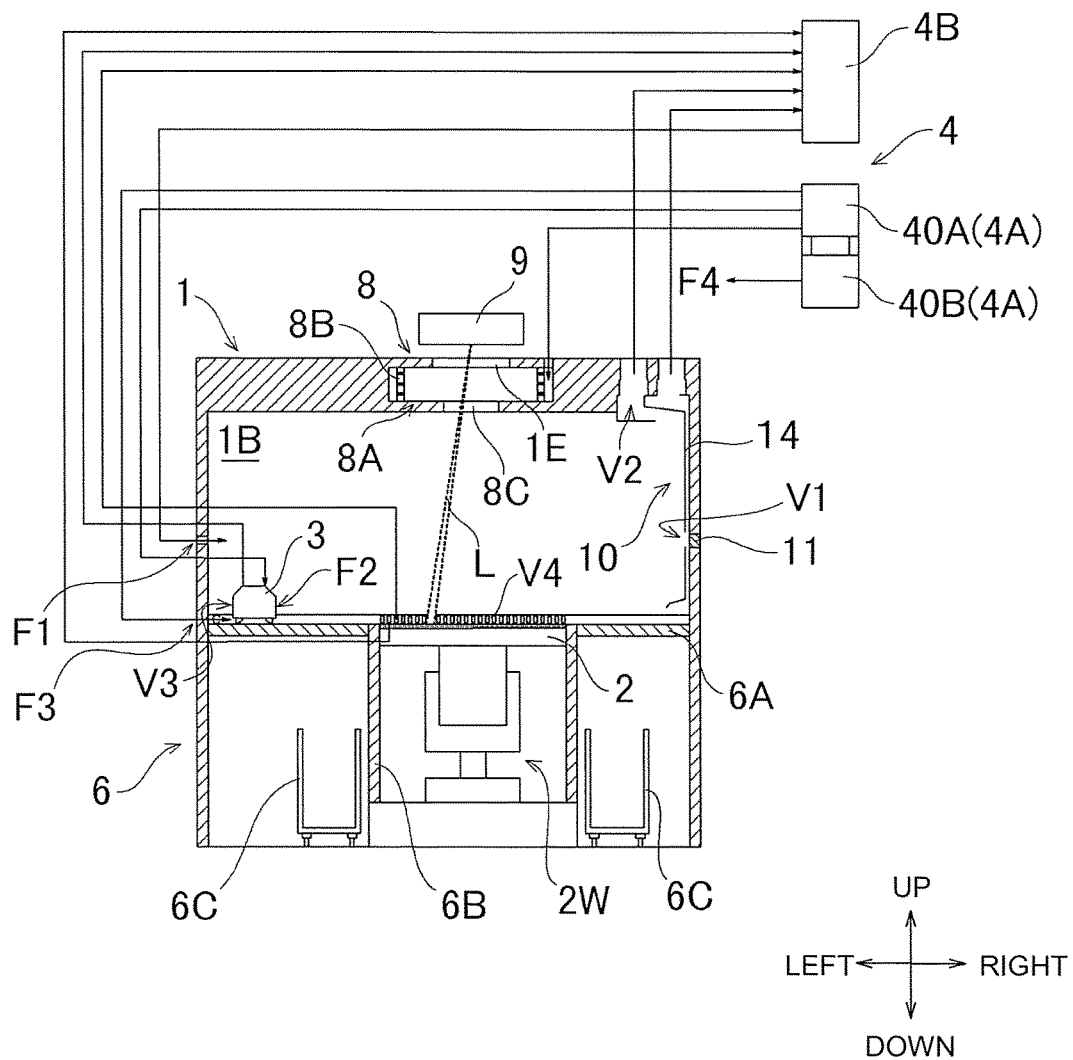
FIG. 1 is a front view of a laminating and shaping apparatus according to an embodiment.

Hereinafter, an embodiment of the present invention will be described with reference to the accompanying drawings.

A laminating and shaping apparatus is an apparatus for generating a three-dimensionally formed object formed of a metal through a metal powder sintering, laminating and shaping method using a laser. The laminating and shaping apparatus is constituted by a machine main body, a power supply apparatus and a control device accommodated in the machine main body, an operation panel installed on a front side of the machine main body, peripheral devices such as a fume collector set on a rear side of the machine main body, and so on. Further, hereinafter, in the drawing of FIG. 1, a forward side is defined as a front side, a back side is defined as a rear side, a left side is defined as a left side, a right side is defined as a right side, an upper side is defined as an upper side, and a lower side is defined as a lower side, and these will be appropriately described using direction words such as "front," "rear," "left," "right," "up" and "down."

Figure 2:
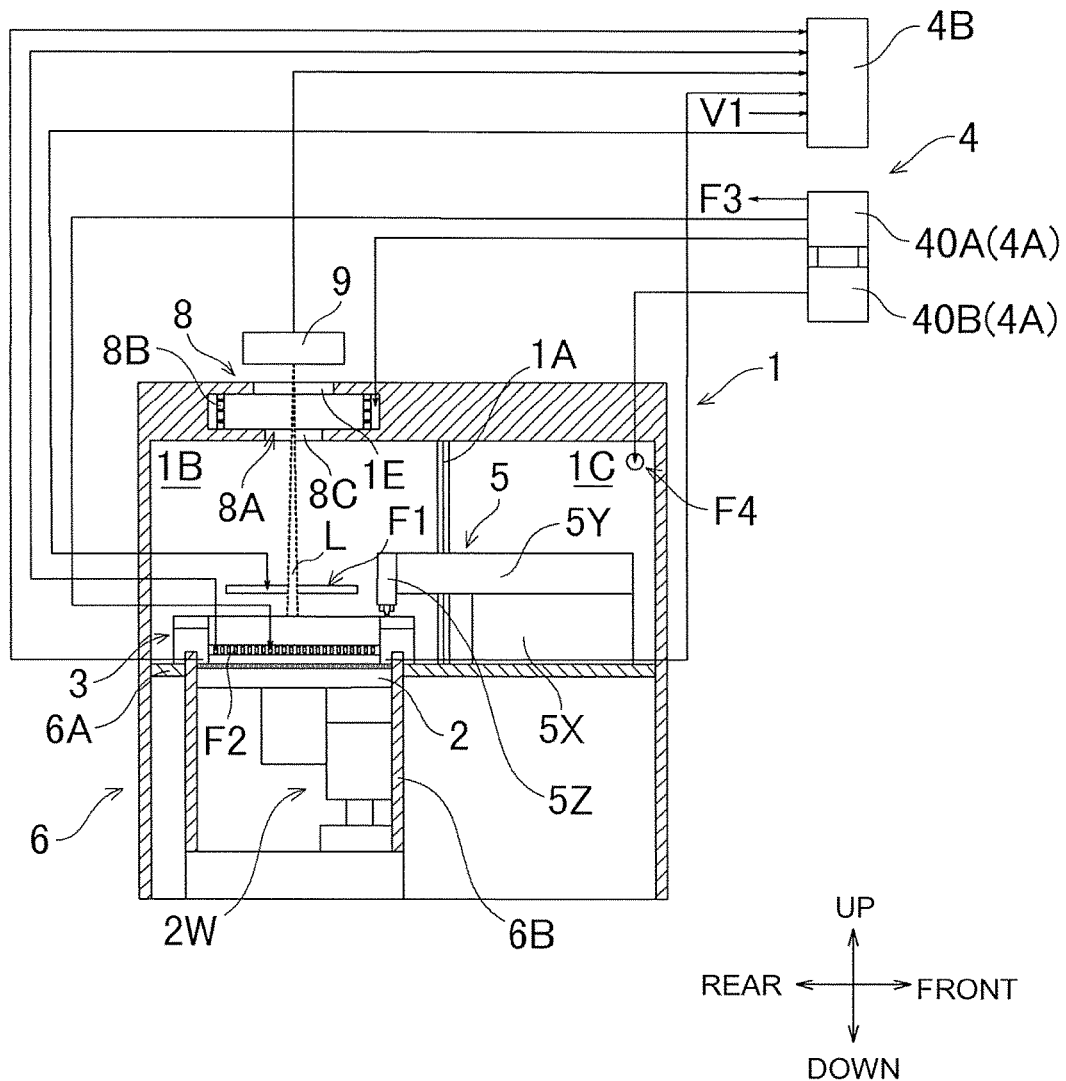
FIG. 2 is a side view of a laminating and shaping apparatus according to the embodiment.

As shown in FIGS. 1 and 2, the laminating and shaping apparatus includes a chamber 1 configured to form a sealed space and accommodate a predetermined irradiation region of a laser L in the sealed space, a recoater head 3 configured to reciprocally move on a shaping base 6A (to be described below) in the chamber 1 in a forward/rearward direction to form a powder layer in at least a predetermined irradiation region, and an inert gas supply/discharge apparatus 4 configured to circulate and supply an inert gas into the chamber 1.

The chamber 1 is a means configured to form an environment suitable for sintering a powder material having an oxygen concentration less than a predetermined value. As shown in FIG. 2, the chamber 1 is divided into a shaping chamber 1B serving as a sealed space at a rear side and a driving chamber 1C serving as a sealed space at a front side by a bellows 1A serving as a partition that is expandable and contractible in the forward/rearward direction of the machine main body. A slight gap through which an inert gas can pass is present between the shaping chamber 1B and the driving chamber 1C. A cutting apparatus 5 for finishing a surface of a sintered body generated by appropriate radiation of the laser L is accommodated in the driving chamber 1C.

A shaping region including a predetermined irradiation region of the laser L is formed in the shaping chamber 1B. The shaping region is a working region in which shaping is performed as a whole, and corresponds to the entire upper surface of a shaping table 2. The predetermined irradiation region is present in the shaping region, and approximately coincides with a region surrounded by an outline shape of a desired three-dimensionally formed object. Accordingly, the predetermined irradiation region has different areas for every separate layer into which a three-dimensionally formed object having an arbitrary shape is divided according to predetermined heights.

Figure 5:
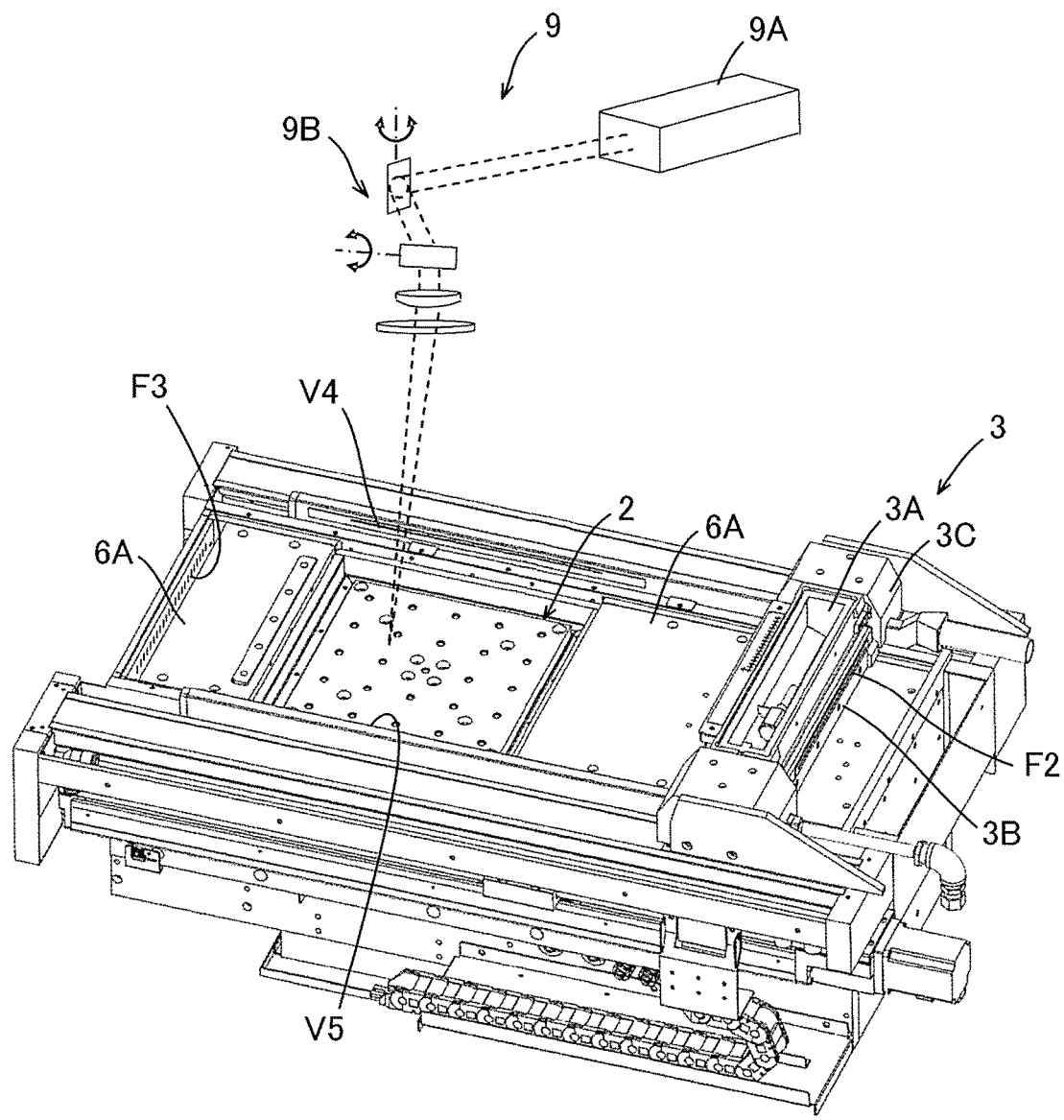
FIG. 5 is a perspective view of a shaping base of the laminating and shaping apparatus shown in FIG. 1.

The shaping base 6A having a flat plate shape and serving as a working table is fixed onto a bed 6 serving as a base frame of the machine main body. As shown in FIGS. 1, 2 and 5, a through-section having a square shape when seen from above is formed in a central section of the shaping base 6A. The shaping table 2 in which an outline shape of an upper surface is similar to an inner shape of the through-section is fitted into a central space of an inner space of the bed 6 communicating with the through-section of the shaping base 6A to be freely moved up and down using the upper surface of the shaping base 6A as an upper limit. In the laminating and shaping apparatus of the embodiment, when the recoater head 3 moves on the shaping base 6A including the upper surface of the shaping table 2 and the powder material is spread, a shaping region is formed on the upper surface of the shaping table 2.

A central space is formed between the shaping base 6A and the shaping table 2 to surround the shaping table 2, and a material holding wall 6B configured to accumulate a powder material is installed in the central space. An annular packing or seal is installed at a circumferential edge of the shaping table 2, and the central space in which the powder material is laid is sealed. The packing or seal is formed of a material slidable with respect to the wall surface of the material holding wall 6B such that the shaping table 2 can move in the central space surrounded by the material holding wall 6B in an upward and downward direction.

A driving mechanism 2W configured to reciprocally move the shaping table 2 in the central space in the upward/downward direction is installed in the inner space of the bed 6. In addition, a bucket 6C configured to freely drop the powder material spread on the shaping base 6A including the upper surface of the shaping table 2 and accommodating and collecting the powder material is disposed on a lower side of the closed central space in the inner space of the bed 6.

The recoater head 3 is a means configured to spread the powder material to a predetermined uniform thickness in at least a predetermined irradiation region on the shaping base 6A. The recoater head 3 is alternately and reciprocally moved in the shaping chamber 1B of the chamber 1 by a driving mechanism (not shown) in the leftward/rightward direction.

Figure 3:
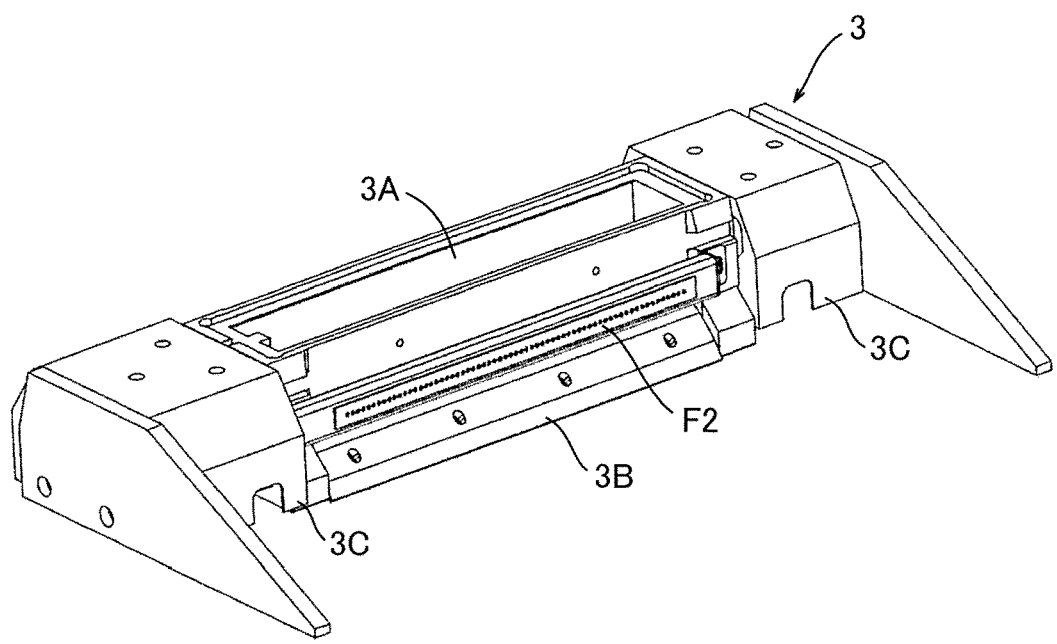
FIG. 3 is a perspective view of a recoater head of the laminating and shaping apparatus shown in FIG. 1 when seen from a diagonally upward direction.
Figure 4:
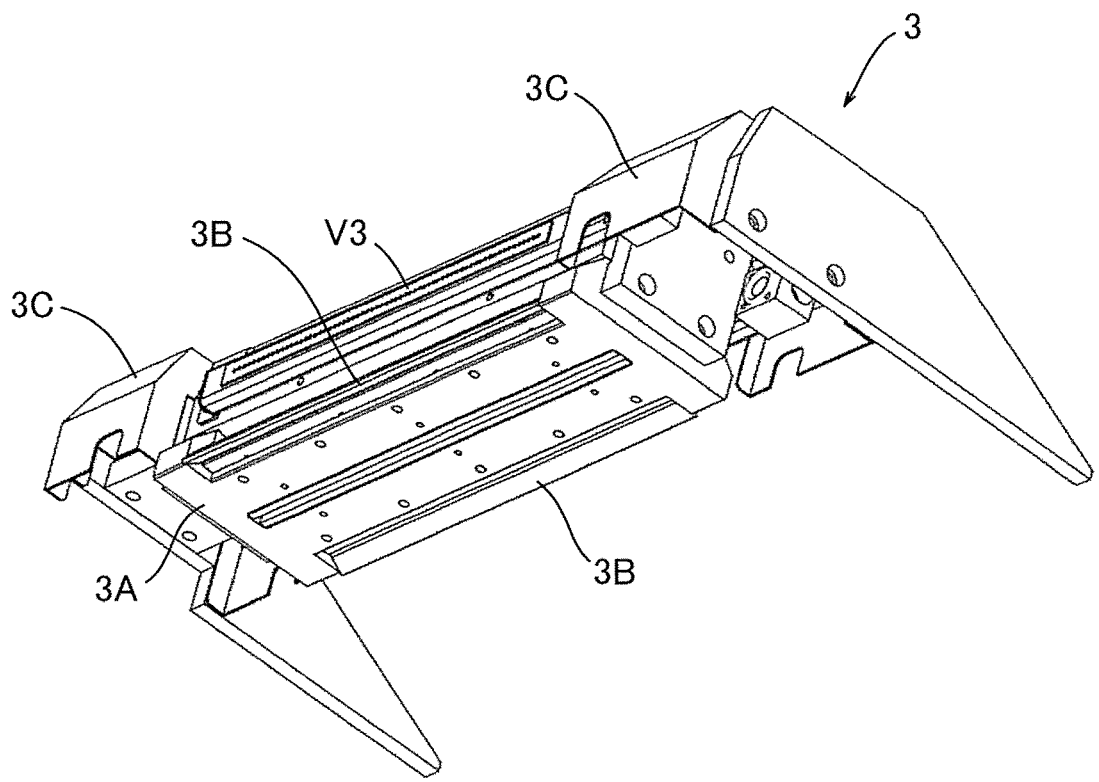
FIG. 4 is a perspective view of the recoater head of the laminating and shaping apparatus shown in FIG. 1 when seen from a diagonally downward direction.

As shown in FIGS. 3 and 4, the recoater head 3 includes a material storage box 3A configured to store the powder material, a blade 3B configured to spread the powder material stored in the material storage box 3A on the shaping base 6A and smoothen the powder material to a uniform thickness, and a guide unit 3C configured to guide reciprocal movement of the recoater head 3.

The material storage box 3A substantially forms a main body of the recoater head 3. As shown in FIG. 2, the material storage box 3A has an overall length larger than a depth of the shaping region in the forward/rearward direction of the machine main body.

The blade 3B has substantially the same blade length as the depth of the shaping region in the forward/rearward direction of the machine main body. The blade 3B is attached to a lower side of the material storage box 3A such that a distance between the blade edge and the upper surface of the shaping base 6A is equal to the thickness of the powder layer. Two blades 3B having the same shape are installed in the material storage box 3A to be symmetrical with respect to a central axis in a direction perpendicular to the moving direction of the recoater head 3.

In the pair of blades 3B, the blade 3B, at which the recoater head 3 is on a front side in the moving direction, pushes obstacles such as chips due to cutting, which become obstructions in the sintering process, out of the shaping region and eliminates them during movement of the recoater head 3. The blade 3B that is on the rear side spreads the powder material to a predetermined thickness by causing the powder material dropped and supplied from material storage box 3A, a center of a lower surface of which is open, to flow from a gap formed between the blade edge and the shaping base 6A during movement of the recoater head 3. When the moving direction of the recoater head 3 is reversed, the blades 3B on the front and rear sides are exchanged with each other.

A fume diffusion apparatus 8 is a means configured to prevent soot containing fine metal particles, generated in the predetermined irradiation region, from adhering to a window 1E. The fume diffusion apparatus 8 includes a disk-shaped housing 8A, and a cylindrical partition plate 8B installed to surround the window 1E in the housing 8A and configured to form an inert gas supply space in the housing 8A.

A circular port 8C configured to allow the laser L radiated downward through the window 1E to pass toward the predetermined irradiation region is installed at a center of a bottom surface of the housing 8A of the fume diffusion apparatus 8. A plurality of pores are punched in the partition plate 8B, and a cleaning space is filled with a clean inert gas supplied from a first supply apparatus 40A of an inert gas supply apparatus 4A (to be described below) through the pores. The inert gas with which the cleaning space is filled flows downward from the circular port 8C in approximately the same direction as the radiation path of the laser L.

The fume diffusion apparatus 8 eliminates the fumes that rise to a ceiling of the chamber 1 and cross the radiation path of the laser L from the radiation path by ejecting the inert gas from the circular port 8C.

A laser radiation apparatus 9 is installed in at least the shaping region such that the laser L can be scanned in directions in two dimensions. As shown in FIG. 5, the laser radiation apparatus 9 includes a laser source 9A configured to generate the laser L and a galvano scanner 9B configured to scan the laser L. The laser L is not limited in kind as long as a powder material can be sintered, and for example, may be a $CO_2$ laser, a fiber laser or a YAG laser. The window 1E is formed of a material that as much as possible does not lower the energy of the laser L and is permeable without distorting an advancing direction. For example, when the type of the laser L is a fiber laser or a YAG laser, the window 1E may be of quartz glass.

As shown in FIGS. 1 and 2, the laser L oscillated from the laser radiation apparatus 9 passes through the window 1E and crosses the shaping chamber 1B by being longitudinally radiated. The laser radiation apparatus 9 radiates the laser L having a required energy to the predetermined irradiation region on the powder layer formed by uniformly spreading the powder material to a predetermined height for each separate layer of the plurality of separate layers obtained by dividing a three-dimensionally formed object having a desired shape to a predetermined height, and forms a sintered layer.

A cutting apparatus 5 has a driving apparatus 5X configured to reciprocally move a moving body in the leftward/rightward direction, a driving apparatus 5Y configured to reciprocally move the moving body in the forward/rearward direction, and a driving apparatus 5Z configured to reciprocally move a processing head in the upward/downward direction, in order to relatively move a cutting tool attached to a spindle in an arbitrary direction in three dimensions. In the laminating and shaping apparatus of the embodiment, the driving apparatus 5Y is mounted on the driving apparatus 5X and the driving apparatus 5Z is installed in a tip area of the driving apparatus 5Y.

The inert gas supply/discharge apparatus 4 is a means configured to supply an inert gas into the chamber 1 from an inert gas supply apparatus 4A serving as a supply source of fresh inert gas and restrict an oxygen concentration of the shaping chamber 1B to less than a predetermined value. In addition, the inert gas supply/discharge apparatus 4 is a means configured to collect contaminated gas generated in the shaping chamber 1B, remove impurities therefrom, and return it to the shaping chamber 1B.

The inert gas supply/discharge apparatus 4 includes the inert gas supply apparatus 4A, and a fume collector 4B serving as a dust collector configured to purify the contaminated gas collected from the chamber 1. The inert gas is a gas that does not substantially react with the powder material, for example, nitrogen gas. The inert gas supply apparatus 4A of the embodiment may be a supply source for a high purity inert gas, specifically, a liquid nitrogen container including a valve. In addition to nitrogen gas, for example, argon gas or helium gas may be applied as the inert gas. The inert gas supply apparatus 4A is constituted by the first supply apparatus 40A configured to supply an inert gas into the shaping chamber 1B and a second supply apparatus 40B configured to supply an inert gas into the driving chamber 1C.

As shown in FIGS. 1 and 2, a first inert gas supply port F1 configured to supply the insert gas from which impurities have been removed by the fume collector 4B into the shaping chamber 1B, and second and third inert gas supply ports F2 and F3 configured to supply the inert gas sent from the first supply apparatus 40A into the shaping chamber 1B are installed in the laminating and shaping apparatus.

The first inert gas supply port F1 is installed on a left wall surface of the chamber 1. The first inert gas supply port F1 is installed at a height lower than the center between the bottom surface and the ceiling of the chamber 1. The second inert gas supply port F2 is installed on a right side surface of the recoater head 3. The third inert gas supply port F3 is installed in a pipeline laid immediately over a left end of the shaping base 6A. The third inert gas supply port F3 is selectively switched to the third inert gas supply port F3 from the second inert gas supply port F2 and released when the recoater head 3 passes through the predetermined irradiation region and the second inert gas supply port F2 is at a position facing a first gas collecting port V1 without the predetermined irradiation region interposed therebetween. Here, the third inert gas supply port F3 supplies an insert gas having the same predetermined pressure and flow rate as the inert gas supplied from the second inert gas supply port F2 into the chamber 1.

A fourth inert gas supply port F4 configured to supply the inert gas sent from the second supply apparatus 40B into the driving chamber 1C is installed in the laminating and shaping apparatus. The fourth inert gas supply port F4 is installed on an upper end portion of the front side of the left wall surface of the chamber 1.

In addition, first to fifth gas collecting ports V1 to V5 configured to collect the contaminated gas are installed in the laminating and shaping apparatus.

The first gas collecting port V1 is installed at a height of a gas collecting mechanism 10 lower than a center between the bottom surface and the ceiling of the chamber 1. The second gas collecting port V2 is installed near a right wall surface of the ceiling section of the chamber 1. The third gas collecting port V3 is installed on a left side surface of the recoater head 3. The fourth gas collecting port V4 is formed in the discharge pipe such that the discharge pipe is installed along a guide rail configured to guide the recoater head 3 and adjacent to the shaping region and open toward the shaping region. The fifth gas collecting port V5 is installed to face the fourth gas collecting port V4 with the shaping region sandwiched therebetween. Further, the first gas collecting port V1 and the second gas collecting port V2 will be described below in detail.

Figure 6:
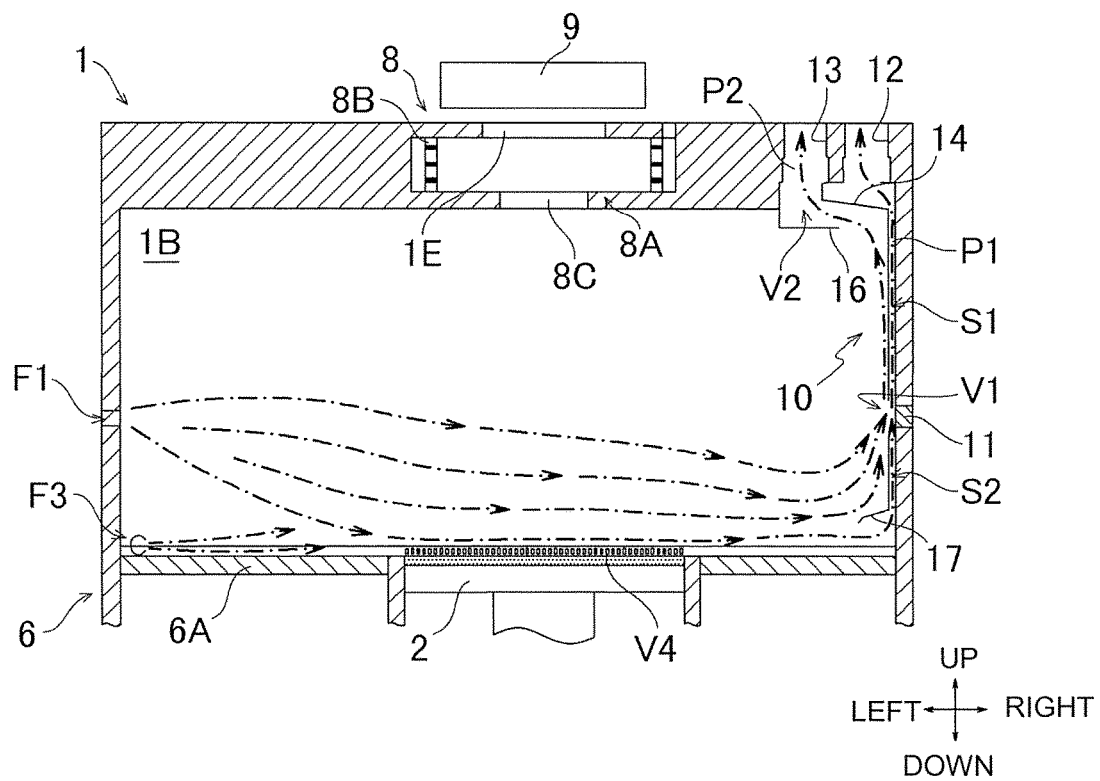
FIG. 6 is an enlarged side view of the inside of a chamber of the laminating and shaping apparatus shown in FIG. 1.

Next, the gas collecting mechanism 10 configured to collect the contaminated gas will be described. As shown in FIG. 6, the gas collecting mechanism 10 is installed from the right wall surface to the ceiling section of the chamber 1. The gas collecting mechanism 10 has a partition member 14, the first gas collecting port V1, a gas suction fan 11, a first gas guide space section S1, a first duct 12, the second gas collecting port V2, a second duct 13, a second gas guide space section S2, and so on.

The first gas collecting port V1 is formed between the plate-shaped partition member 14 extending along the inner wall of the right wall surface of the chamber 1 from the lower side of the right wall surface to the ceiling section and the right wall surface to cover substantially the entire surface of the right wall surface of the chamber 1. The first gas collecting port V1 has a height equal to that of the first inert gas supply port F1 and is disposed facing the first inert gas supply port F1 in the forward/rearward direction. The first gas collecting port V1 has a rectangular parallelepiped shape elongated in the forward/rearward direction. A width of the first gas collecting port V1 in the forward/rearward direction is substantially equal to a width of the inner wall of the right wall surface of the chamber 1 in the forward/rearward direction. The plurality of gas suction fans 11 are installed in the first gas collecting port V1.

Figure 7:
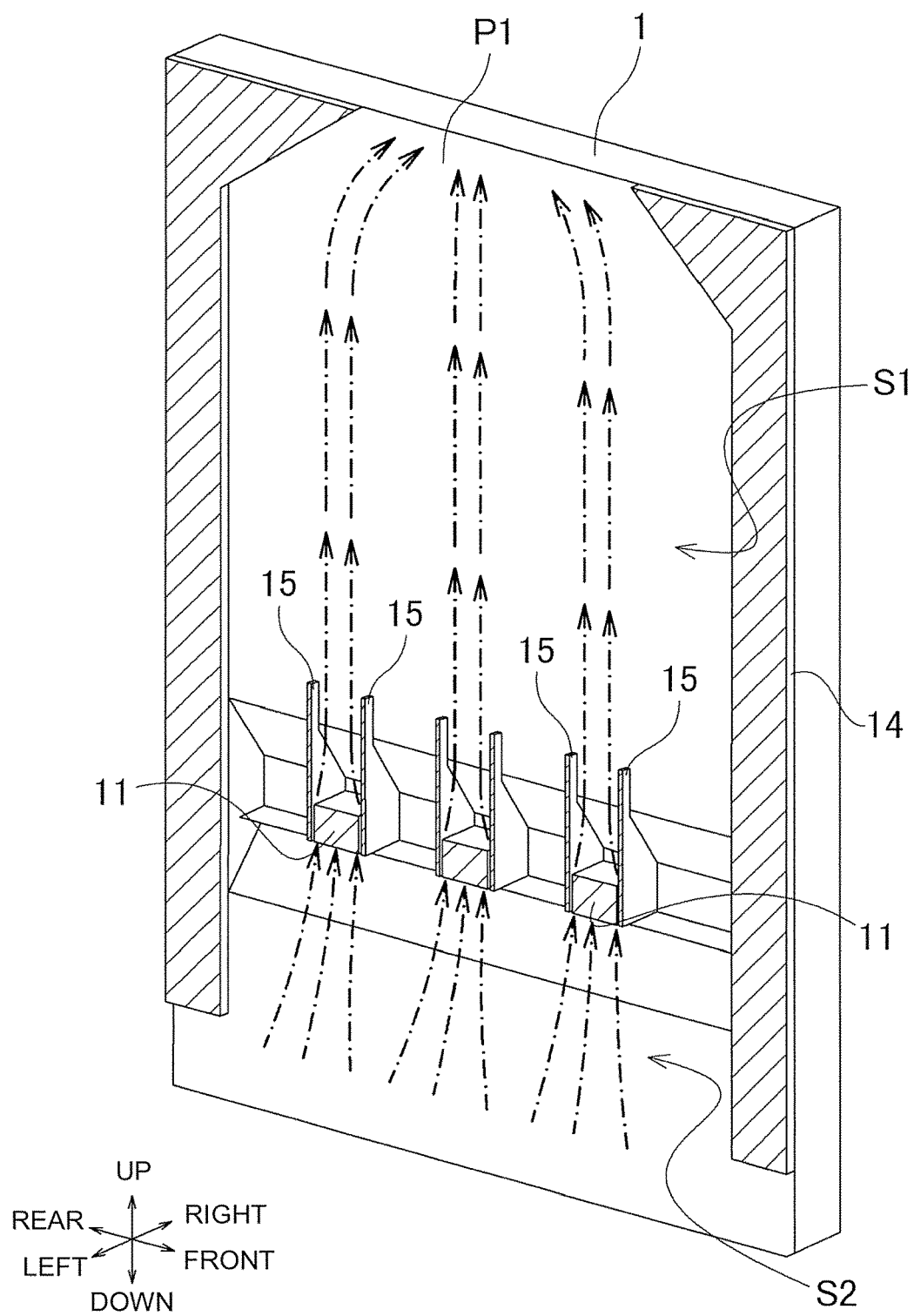
FIG. 7 is a cross-sectional perspective view of a partition member of the laminating and shaping apparatus and a partition member of a right wall surface of the chamber shown in FIG. 1.

As shown in FIG. 7, the plurality of gas suction fans 11 are disposed parallel to each other in the forward/rearward direction at predetermined intervals. In the embodiment, three gas suction fans 11 are installed in the first gas collecting port V1. Straightening plates 15 extending in an upward direction are installed at both end portions of the gas suction fan 11 in the forward/rearward direction.

The first gas guide space section S1 is configured to guide the contaminated gas guided into the first gas collecting port V1 to the first duct 12 installed on the ceiling section of the chamber 1. The first gas guide space section S1 is formed between the partition member 14 higher than the first gas collecting port V1 and the right wall surface of the chamber 1. An upper portion of the first gas guide space section S1 is formed such that a width thereof narrows in the forward/rearward direction when approaching the upper end thereof. The first gas guide space section S1 communicates with the first duct 12.

The first duct 12 has a substantially tubular shape. As shown in FIG. 6, the first duct 12 is installed in a ceiling section adjacent to an upper end of the right wall surface of the chamber 1. The first duct 12 is disposed on an extension line of a centerline of the right wall surface of the chamber 1 in the forward/rearward direction when seen in the leftward/rightward direction. That is, the first duct 12 is installed on an upper end portion of the first gas guide space section S1, i.e., an upper side of a portion at which the width in the forward/rearward direction is narrowest. The first duct 12 is connected to the fume collector 4B via a pipeline. A first gas collecting flow path P1 is formed by the first gas collecting port V1, the first gas guide space section S1 and the first duct 12.

The second gas collecting port V2 is installed in the ceiling section adjacent to the right wall surface of the chamber 1. The second gas collecting port V2 has a rectangular parallelepiped shape elongated in the forward/rearward direction. A width of the second gas collecting port V2 in the forward/rearward direction is substantially equal to a width of the inner wall of the right wall surface of the chamber 1 in the forward/rearward direction. The second gas collecting port V2 has a gas guide plate 16 installed therein, having substantially a plate shape and extending in an L shape from a left side of an opening section thereof toward the right wall surface when seen in the forward/rearward direction. A width of the gas guide plate 16 in the forward/rearward direction is equal to a width of the inner wall of the right wall surface of the chamber 1 in the forward/rearward direction. The second gas collecting port V2 comes in contact with the second duct 13.

The second duct 13 has a substantially tubular shape. The second duct 13 is installed adjacent to a left side of the first duct 12 in the ceiling section of the chamber 1 in a state in which the second duct 13 is separated from the first duct 12. The second duct 13 is connected to the fume collector 4B via a pipeline. The pipeline that connects the second duct 13 and the fume collector 4B is independent from the pipeline that connects the first duct 12 and the fume collector 4B. A second gas collecting flow path P2 is formed by the second gas collecting port V2 and the second duct 13.

As shown in FIG. 6, regarding the first gas collecting flow path P1 and the second gas collecting flow path P2, a section from the first gas collecting port V1 to the first duct 12 in the first gas collecting flow path P1 and a section from the second gas collecting port V2 to the second duct 13 in the second gas collecting flow path P2 are separated by the partition member 14.

The second gas guide space section S2 is configured to guide the contaminated gas carried to a position separated from the first gas collecting port V1, at which a suction force of the gas suction fan 11 is weakened, more specifically, close to the bottom surface of the chamber 1, to the first gas collecting port V1. The second gas guide space section S2 is formed between the partition member 14 lower than the first gas collecting port V1 and the right wall surface of the chamber 1. In addition, a gas guide plate 17 having substantially a plate shape and extending from the lower end of the partition member 14 in a leftward and downward direction is installed on the lower end of the partition member 14 when seen in the forward/rearward direction. A width of the gas guide plate 17 in the forward/rearward direction is substantially equal to a width of the inner wall of the right wall surface of the chamber 1 in the forward/rearward direction.

Next, flows of the inert gas and the contaminated gas supplied into the shaping chamber 1B and a collecting path that reaches the fume collector 4B will be described with reference to FIGS. 6 and 7. Further, in FIG. 6, description of the recoater head 3 will be omitted for the purpose of clarification of the flows of the inert gas and the contaminated gas, and the case in which the inert gas is supplied from the third inert gas supply port F3 will be described. In addition, in FIGS. 6 and 7, the flows of the inert gas and the contaminated gas are shown by dotted-dashed arrows.

As shown in FIG. 6, the inert gas supplied from the first inert gas supply port F1 and the third inert gas supply port F3 forms a flow along the bottom surface of the chamber 1 to cross a predetermined shaping region including a radiation position serving as a fume source. Here, the fumes generated in the shaping region due to sintering of the laser are collected from the third to fifth gas collecting ports V3 to V5. Then, the fumes that are not collected from the third to fifth gas collecting ports V3 to V5 are carried to the right wall surface of the chamber 1 as a contaminated gas together with the inert gas.

The contaminated gas is suctioned from the first gas collecting port V1 by a suction force of the gas suction fan 11 and sent to the first gas guide space section S1 when the contaminated gas approaches the right wall surface of the chamber 1. In addition, the contaminated gas carried close to the bottom surface of the chamber 1 is guided by the gas guide plate 17 to be introduced into the second gas guide space section S2. Then, the contaminated gas is raised in the second gas guide space section S2 along the right wall surface of the chamber 1 by being carried on the original flow, and is sent to the first gas guide space section S1.

Then, as shown in FIG. 7, a direction of the contaminated gas sent to the first gas guide space section S1 from the first gas collecting port V1 and the second gas guide space section S2 is adjusted to an upward direction while a width of the gas flow in the forward/rearward direction is defined by the two rectifying plates 15 installed at both of front and rear end sections of the gas suction fan 11. More specifically, when the three gas suction fans 11 are installed in the first gas collecting port V1, as in this embodiment, in the first gas guide space section S1, three flows of the contaminated gas in the upward direction are generated, and they join together at the upper end portion at which the width of the first gas guide space section S1 narrows and are sent to the first duct 12.

In addition, as shown in FIG. 6, the contaminated gas that is not collected from the first gas collecting port V1 is raised to the ceiling section of the chamber 1 along the partition member 14. Then, as the contaminated gas is guided by the gas guide plate 16, the contaminated gas is introduced into the second duct 13 from the second gas collecting port V2.

The gases that reach the first duct 12 and the second duct 13 are sent to the fume collector 4B through the pipelines that are independent from each other.

(Effects)

In the embodiment, the first gas collecting port V1 is formed in the partition member 14 having a plate shape and extending along the inner wall of the right wall surface of the chamber 1 from the lower side of the right wall surface to the ceiling section to cover the substantially entire surface of the right wall surface of the chamber 1, and the first gas guide space section S1 is formed between the partition member 14 higher than the first gas collecting port V1 and the right wall surface of the chamber 1. In addition, the three gas suction fans 11 are installed in the first gas collecting port V1. In addition, the first gas guide space section S1 communicates with the first duct 12 installed on the ceiling section adjacent to the upper end of the right wall surface of the chamber 1. Accordingly, the contaminated gas from the first gas collecting port V1 installed on the partition member 14 can be suctioned into the first gas guide space section S1 and be guided along the right wall surface of the chamber 1 in an upward direction by being carried on the flow of the original contaminated gas, and sent to the fume collector 4B from the first duct 12 while restricting variation in direction of the flow of the contaminated gas rising along the partition member 14 to a minimum amount. Accordingly, the contaminated gas can be more efficiently discharged outside of the chamber 1 by utilizing the flow of the contaminated gas originally formed in the chamber 1.

In addition, an amount of the contaminated gas that leaks without being collected from the first gas collecting port V1 can be reduced by creating a flow for efficient collection of the contaminated gas that continues to the first gas collecting port V1, the first gas guide space section S1 and the first duct 12. Accordingly, the contaminated gas that leaks without being collected from the first gas collecting port V1 can be collected without leakage from the second gas collecting port V2, rather than adding to the configuration of the laminating and shaping apparatus, like installing the gas suction fan 11 in the second gas collecting port V2, or the like. As described above, according to the embodiment, the contaminated gas can be discharged without leakage to the outside of the chamber 1.

In addition, regarding the first gas collecting flow path P1 and the second gas collecting flow path P2, the section from the first gas collecting port V1 to the first duct 12 in the first gas collecting flow path P1 and the section from the second gas collecting port V2 to the second duct 13 in the second gas collecting flow path P2 are separated by the partition member 14. Accordingly, the contaminated gas sent from the first gas collecting flow path P1 can be prevented from flowing backward to the second gas collecting flow path P2 and returning into the chamber 1 from the second gas collecting port V2.

In addition, the rectifying plates 15 extending in the upward direction are installed at both end portions of the gas suction fan 11 in the forward/rearward direction. Accordingly, the width of the flow of the contaminated gas in the forward/rearward direction is defined, and a direction of the flow is adjusted to the upward direction. Accordingly, the contaminated gas can be prevented from staying in the first gas guide space section S1, and can be more efficiently guided into the first duct 12.

In addition, the second gas collecting port V2 has the gas guide plate 16 installed therein, having substantially a plate shape and extending in an L shape from the left side of the opening section to the right wall surface when seen in the forward/rearward direction. Accordingly, a small amount of contaminated gas that reaches the ceiling section of the chamber 1 can be reliably guided without being collected from the first gas collecting port V1 to the second gas collecting port V2, and can be sent to the fume collector 4B from the second duct 13.

In addition, the gas guide plate 17 having substantially a plate shape and extending from the lower end of the partition member 14 in a leftward and downward direction is installed on the lower end of the partition member 14 when seen in the forward/rearward direction. Accordingly, the contaminated gas carried to a place separated from the first gas collecting port V1 at which a suction force by the gas suction fan 11 is reduced, i.e., adjacent to the bottom surface of the chamber 1 can be guided into the second gas guide space section S2 by being carried on the original flow. Then, as the contaminated gas is guided along the right wall surface of the chamber 1 in the upward direction, the contaminated gas carried to the place at which the suction force by the gas suction fan 11 is reduced can be reliably guided to the first gas guide space section S1.

Hereinabove, while an appropriate embodiment of the present invention has been described, the present invention is not limited to the above-mentioned embodiment or examples and various design changes may be made without departing from the spirit of the following claims.

In the embodiment, while the pipeline that connects the first gas collecting flow path P1 and the fume collector 4B and the pipeline that connects the second gas collecting flow path P2 and the fume collector 4B have been described as being separated and independent, the pipeline connected to a portion downstream from the first duct 12 and the second duct 13, i.e., the fume collector 4B may be connected to the fume collector 4B by being joined to a middle portion thereof.

In addition, in the embodiment, while the three gas suction fans 11 have been described as being installed, the number of gas suction fans 11 is not limited to a specific number and several gas suction fans 11 may be installed.

In addition, in the embodiment, while the first gas collecting port V1 has been described as having a rectangular parallelepiped shape elongated in the forward/rearward direction, for example, a shape of the first gas collecting port V1 may be any shape such as an oval shape elongated in the forward/rearward direction.

In addition, in the embodiment, while the width of the first gas collecting port V1 in the forward/rearward direction has been described as being substantially equal to the width of the inner wall of the right wall surface of the chamber 1 in the forward/rearward direction, the width of the first gas collecting port V1 in the forward/rearward direction may be smaller than the width of the inner wall of the right wall surface of the chamber 1 in the forward/rearward direction. For example, the width of the first gas collecting port V1 in the forward/rearward direction may be substantially equal to the width of the shaping region formed on the shaping table 2 in the forward/rearward direction.

In addition, in the embodiment, while the second gas collecting port V2 has been described as having a rectangular parallelepiped shape elongated in the forward/rearward direction, for example, a shape of the second gas collecting port V2 may be any shape such as an oval shape elongated in the forward/rearward direction.

In addition, in the embodiment, while the width of the second gas collecting port V2 in the forward/rearward direction has been described as being equal to the width of the inner wall of the right wall surface of the chamber 1 in the forward/rearward direction, the width of the second gas collecting port V2 in the forward/rearward direction may be smaller than the width of the inner wall of the right wall surface of the chamber 1 in the forward/rearward direction. For example, the width of the second gas collecting port V2 in the forward/rearward direction may be substantially equal to the width of the shaping region formed on the shaping table 2 in the forward/rearward direction.

In addition, in the embodiment, the width of the gas guide plate 16 in the forward/rearward direction is substantially equal to the width of the inner wall of the right wall surface of the chamber 1 in the forward/rearward direction. The width of the gas guide plate 16 in the forward/rearward direction may be smaller than the width of the inner wall of the right wall surface of the chamber 1 in the forward/rearward direction. For example, the width of the gas guide plate 16 in the forward/rearward direction may be substantially equal to the width of the shaping region formed on the shaping table 2 in the forward/rearward direction.

In addition, in the embodiment, while the gas guide plate 16 has been described as being a substantially plate-shaped member extending in an L shape from the left side of the opening section of the second gas collecting port V2 toward the right wall surface, a shape of the gas guide plate 16 may be any shape as long as the gas guide plate 16 opens at a right wall surface side of the chamber 1 and the contaminated gas can be guided to the second gas collecting port V2.

In addition, in the embodiment, while the width of the gas guide plate 17 in the forward/rearward direction has been described as being substantially equal to the width of the inner wall of the right wall surface of the chamber 1 in the forward/rearward direction, the width of the gas guide plate 17 in the forward/rearward direction may be smaller than the width of the inner wall of the right wall surface of the chamber 1 in the forward/rearward direction. For example, the width of the gas guide plate 17 in the forward/rearward direction may be substantially equal to the width of the shaping region formed on the shaping table 2 in the forward/rearward direction.

In addition, although in the embodiment, the gas guide plate 17 has been described as being a substantially plate-shaped member extending from the lower end of the partition member 14 in the leftward and downward direction when seen in the forward/rearward direction, a shape of the gas guide plate 17 may be any shape as long as the gas guide plate 17 opens at a left wall surface side of the chamber 1 and the contaminated gas can be guided to the second gas guide space section S2.

In addition, in the embodiment, while the first and second ducts 12 and 13 have been described as having a substantially tubular shape, the first and second ducts 12 and 13 may have any shape as long as they can communicate with a pipeline on a downstream side. In addition, plural of each of first and second ducts 12 and 13 may be provided.

In addition, in the embodiment, while the case in which the partition member 14 and the right wall surface of the chamber 1 are constituted by separate members has been described, the partition member 14 and the right wall surface of the chamber 1 may not be separate members. For example, a partition section may be formed integrally with the right wall surface of the chamber 1.

What is claimed is:

1. A laminating and shaping apparatus comprising:
a table on which a powder material of a metal is laid;
a recoater head that reciprocally moves in a horizontal single axis direction to supply the powder material onto the table and planarize the powder material to form a powder layer;
a chamber configured to form a sealed space and accommodate the table and the recoater head in the sealed space;
a laser radiation apparatus configured to radiate a laser to a predetermined region of the powder layer and sinter the powder layer to form a sintered layer;
an inert gas supply apparatus configured to supply an inert gas into the chamber;
an inert gas supply port connected to the inert gas supply apparatus and installed on a first wall surface of the chamber;

a gas collecting mechanism installed from a second wall surface of the chamber opposite to the first wall surface to a ceiling section; and a gas collecting apparatus configured to collect gas collected by the gas collecting mechanism, wherein the gas collecting mechanism has:

a partition section extending to a ceiling section along the second wall surface with a predetermined interval therebetween;

a first gas collecting port formed in the partition section;

a suction apparatus installed in the first gas collecting port;

a first gas guide space section formed between the partition section and the second wall surface;

a first duct communicating with the first gas guide space section and installed on the ceiling section;

a second gas collecting port installed on the ceiling section adjacent to the second wall surface; and a second duct communicating with the second gas collecting port.

2. The laminating and shaping apparatus according to claim 1, wherein the first gas collecting port, the first gas guide space section and the first duct form a first gas collecting flow path, the second gas collecting port and the second duct form a second gas collecting flow path, and in the first gas collecting flow path and the second gas collecting flow path, at least a section from the first gas collecting port to an upstream portion of the first duct and a section from the second gas collecting port to an upstream portion of the second duct are separated.

3. The laminating and shaping apparatus according to claim 1, wherein rectifying plates configured to adjust a flow of a gas sent to the first gas guide space section in an upward direction are installed at both sides of the suction apparatus.

4. The laminating and shaping apparatus according to claim 1, wherein a gas guide section opening at the second wall surface side and configured to guide a gas raised to the ceiling section along the partition section without being collected from the first gas collecting port to the second collecting port is installed in the second gas collecting port.

5. The laminating and shaping apparatus according to claim 1, wherein the partition section is formed to extend along an inner wall of the second wall surface from the first gas collecting port to a near side of a bottom surface of the chamber, and the gas collecting mechanism further has a second gas guide space section formed between the partition section below the first gas collecting port and the second wall surface.

* * * * *